Feb. 21, 1950     M. M. YOURGLICH ET AL     2,498,324
SPEEDNUT HOLDER
Filed Sept. 10, 1945
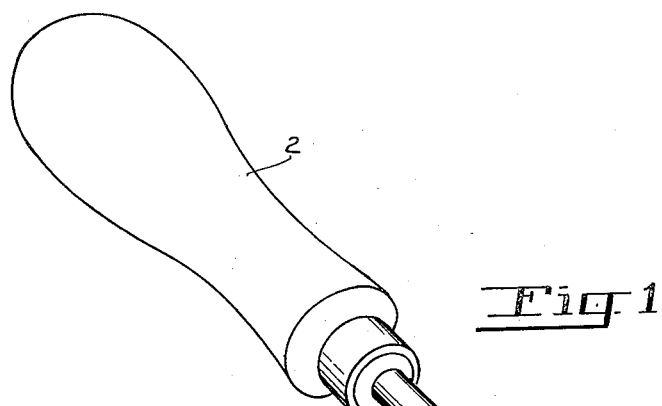
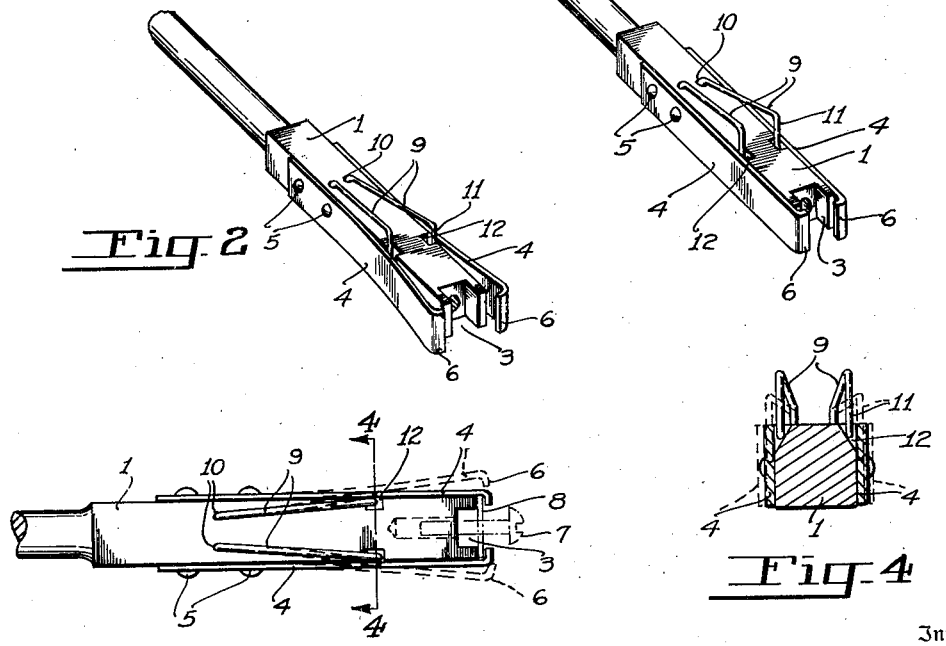
Inventors
MILDRED M. YOURGLICH
HUGO M. BOWE
By Reynolds & Beach
Attorneys Patented Feb. 21, 1950

2,498,324

UNITED STATES PATENT OFFICE 2,498,324

SPEEDNUT HOLDER

Mildred M. Yourglich and Hugo M. Bowe, Seattle, Wash., assignors to Boeing Airplane Company, a corporation of Delaware Application September 10, 1945, Serial No. 615,280

4 Claims. (Cl. 81—3)

The present invention concerns a tool for the holding of a nut or the like, and in particular a nut of the type termed Speednut, which is a piece of resilient sheet metal which locks upon the screw by reason of its resilience, for the engagement with such nut of a screw to be threaded thereinto, to hold together constructional parts. Such holding means are widely used in aircraft construction, and there is need for a holder for such nuts which will grip them firmly and securely and prevent their rotation during the process of screwing home, and which then may be readily released and withdrawn and made ready for engagement with the next nut.

The accomplishment of the above ends, in a tool which is simple, inexpensive, and convenient to use, is the object of this invention.

The invention is shown in a practical form, and the principles thereof may be incorporated in such other forms as come within the scope of the appended claims.

Figure 1 is a perspective view of the tool in its normal or relaxed position, and in the position it would occupy while holding a nut, and Figure 2 is a similar view with parts in the releasing position, or ready for engagement with another nut.

Figure 3 is a plan view showing in full lines the engaging position and in dash lines the releasing position, and Figure 4 is a cross-sectional view taken along the line 4—4 of Figure 3.

The tool includes a central post 1 supported from a handle 2 in any suitable fashion, the post being formed or recessed at its end at 3 to receive a Speednut and the screw which engages the nut. The post in this instance is square, and this is a convenient though not an essential shape.

Cooperating with the post, and supported at opposite sides thereof, are two arms 4, which may be made of spring metal, secured, as indicated at 5, to the post to lie at opposite sides thereof. Spring means, either separate from or inherent in the arms themselves, urge inwardly their outer ends, which are formed as inwardly directed fingers 6. These spring fingers may be curved slightly in order to cooperate with the end of the post 1 to support a normally curved Speednut 8 and to prevent its rotation and the post backs up the thrust of the engaging screw, indicated at 7 (see Figure 3).

To effect quick and convenient engagement and release of the nut as required, wedging means are provided, of simple form, which may be engaged by the thumb of the operator to press or wedge outwardly the arms 4 against the spring tension tending to hold them inwardly. To this end spring wires 9, having ends anchored in the post 1 at 10, are provided with inwardly directed pins 11 which are normally urged upwardly, but which when pressed downwardly ride down along the inclined surface 12 of transverse recesses in the sides of the post, which are overlaid by the arm 4. The action is illustrated by the dash lines in Figures 3 and 4. When the wires 9 are pressed downwardly, or toward the post, the pins 11 ride downwardly and outwardly, coming into engagement with the inner faces of the arms 4 and wedging them outwardly until the fingers 6 have been sufficiently separated to disengage the nut 8 and to permit withdrawal axially of the tool as a whole. It will be understood that the tool is first engaged with a Speednut, which is then applied to the work while a screw 7 is threaded into it, and then the fingers 6 are spread in the manner indicated, to disengage the tool from the now secured nut.

We claim as our invention:

1. A tool for supporting engagement with a nut or the like, comprising a pair of nut-holding fingers disposed at opposite sides of the axis of such a nut, a common support for said finger, spring means reacting between the support and said fingers, urging the fingers inwardly towards such axis, means engaging said fingers, and carried and guided by said support for movement transversely of said axis intermediate the fingers and their support, and normally spring-held in inoperative position, and further means engageable with said first means and deflecting the latter outwardly upon the latter's movement from such inoperative position, to urge apart the normally inwardly held fingers.

2. A tool as in claim 1, wherein the finger-engaging means and the deflecting means therefor are formed the one as inclined surfaces and the other as elements deflectable outwardly behind the respective fingers, as such elements move over the respected inclined surfaces.

3. A tool for supporting engagement with a nut or the like, comprising a central post having recesses located back from its end, each with a transversely inclined surface, holding fingers inwardly directed at opposite sides of the end of said post, arms extending alongside said post, overlying said recesses, and each supporting a finger, and spring-urged inwardly towards the post, and pins supported upon the post for movement, each from a normal retracted position, along the inclined surface of a corresponding recess, and thus between the post and a finger to spread the fingers for release of a nut or the like held between the fingers and the end of the post.

4. A tool for supporting engagement with a nut or the like, comprising a central post formed at its end to engage behind such a nut or the like which is to be supported, said post having two transverse recesses at opposite sides, back from its end, the bottoms of which are inclined transversely, a pair of spring arms secured to such opposite recessed sides overlying the recesses, and each terminating in an inwardly directed finger overlying the end of the post, to cooperate therewith in supporting the nut or the like, a pair of pins, one received in each recess, and spring-supported from the post for movement from a normally retracted position along the inclined bottom of its recess, and thus into operative engagement with the corresponding spring arm to urge the latter, with its finger, outwardly to release the supported nut or the like.

MILDRED M. YOURGLICH.
HUGO M. BOWE.

REFERENCES CITED

The following references are of record in the file of this patent:

UNITED STATES PATENTS

| Number | Name | Date |
|---|---|---|
| 1,250,682 | Sholl | Dec. 18, 1917 |
| 1,311,147 | Berntsen | July 22, 1919 |
| 1,641,307 | Velepec | Sept. 6, 1927 |
| 2,266,874 | Larson | Dec. 23, 1941 |

FOREIGN PATENTS

| Number | Country | Date |
|---|---|---|
| 217,581 | Great Britain | Mar. 5, 1925 |